US006676996B2

(12) United States Patent
Pickering et al.

(10) Patent No.: US 6,676,996 B2
(45) Date of Patent: Jan. 13, 2004

(54) PROCESS FOR FORMING FLUOROELASTOMER COMPOSITE MATERIAL CONTAINING POLYDIALKYLSILOXANE PARTICLES

(75) Inventors: Jerry A. Pickering, Hilton, NY (US); Stephen V. Davis, Rochester, NY (US); Nataly Boulatnikov, Ontario, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 10/209,040

(22) Filed: Jul. 31, 2002

(65) Prior Publication Data

US 2003/0003236 A1 Jan. 2, 2003

Related U.S. Application Data

(62) Division of application No. 09/475,840, filed on Dec. 30, 1999, now abandoned.

(51) Int. Cl.[7] .................................................. B05D 3/02
(52) U.S. Cl. ...................................... 427/365; 427/387
(58) Field of Search ................................. 427/387, 365

(56) References Cited

U.S. PATENT DOCUMENTS

| 4,264,181 A | * | 4/1981 | Lentz et al. | 399/324 |
|---|---|---|---|---|
| 4,272,179 A | | 6/1981 | Seanor | 399/324 |
| 4,742,142 A | | 5/1988 | Shimizu et al. | 528/15 |
| 4,743,670 A | | 5/1988 | Yoshida et al. | 528/15 |
| 4,853,737 A | | 8/1989 | Hartley et al. | 399/333 |
| 4,962,165 A | | 10/1990 | Bortnick et al. | 525/479 |
| 5,141,788 A | | 8/1992 | Badesha et al. | 428/36.8 |
| 5,166,031 A | | 11/1992 | Badesha et al. | 430/124 |
| 5,534,347 A | | 7/1996 | Chen et al. | 428/375 |
| 5,582,917 A | | 12/1996 | Chen et al. | 428/421 |
| 5,595,823 A | | 1/1997 | Chen et al. | 428/421 |
| 5,695,878 A | | 12/1997 | Badesha et al. | 428/334 |
| 5,716,667 A | * | 2/1998 | Kashiwada et al. | 427/156 |
| 6,067,438 A | * | 5/2000 | Chen et al. | 399/325 |
| 6,075,966 A | * | 6/2000 | Davis et al. | 399/325 |
| 6,159,588 A | * | 12/2000 | Eddy et al. | 428/215 |
| 6,225,409 B1 | * | 5/2001 | Davis et al. | 525/104 |

FOREIGN PATENT DOCUMENTS

| EP | 25510 | 3/1981 |
|---|---|---|
| JP | 60-81227 | 5/1985 |
| JP | 62-257939 | 11/1987 |
| SU | 952895 | 8/1982 |

OTHER PUBLICATIONS

*Silicone Rubber in Powder Form,* Swanson, Leicht and Wegener, American Chemical Society, Rubber Division, Oct. 1974.

* cited by examiner

*Primary Examiner*—Erma Cameron

(57) ABSTRACT

In a process for forming a fluoroelastomer composite material for use in preparing an image member containing a substrate, a curable fluorocarbon elastomer is combined with preformed polysiloxane particles in an organic solvent, thereby forming a composite mixture. Milling the composite mixture produces a uniform coating dispersion of the fluoroelastomer composite material in the organic solvent.

19 Claims, No Drawings

PROCESS FOR FORMING FLUOROELASTOMER COMPOSITE MATERIAL CONTAINING POLYDIALKYLSILOXANE PARTICLES

CROSS-REFERENCE TO RELATED APPLICATION

This application is a division of U.S. application Ser. No. 09/475,840, filed Dec. 30, 1999, now abn, for FLUOROELASTOMER-SILICONE COMPOSITES USING POLYDIALKYSILOXANE PARTICLES, the disclosure of which is incorporated herein by reference.

FIELD OF THE INVENTION

This invention relates to a composite material containing a preformed polydialkylsiloxane particle dispersed within a cured fluoroelastomer material. One application for this composite material is as fuser members useful for heat-fixing a heat-softenable toner material to a substrate. More particularly, the invention relates to materials usable as a toner release layer in a fuser member.

BACKGROUND OF THE INVENTION

In certain electrostatographic imaging and recording processes, for instance, in electrophotographic copying processes, an electrostatic latent image formed on a photoconductive surface is developed with a developer which is a mixture of carrier particles, e.g., magnetic particles, and a thermoplastic toner powder which is thereafter fused to a receiver such as a sheet of paper. The fusing member can be a roll, belt or any surface having a suitable shape for fixing thermoplastic toner powder images to a substrate. The fusing step commonly consists of passing the substrate, such as a sheet of paper on which toner powder is distributed in an imagewise pattern, through the nip of a pair of rolls, at least one of which is heated. Where the fusing member is a belt it is preferably a flexible endless belt having a smooth, hardened outer surface which passes around a heated roller.

A persistent problem in this operation is that when the toner is heated during contact with the heated roll or belt it may adhere not only to the paper but also to the fusing member. Any toner remaining adhered to the member can cause a false offset image to appear on the next sheet and can also degrade the fusing member. Other potential problems are thermal degradation and abrasion of the member surface which results in an uneven surface and defective patterns in thermally fixed images.

Toner fusing rolls have a cylindrical core which may contain a heat source in its interior, and a resilient covering layer formed directly or indirectly on the surface of the core. Roll coverings are commonly fluorocarbon polymers or silicone polymers, such as poly(dimethylsiloxane) polymers, of low surface energy which minimizes adherence of toner to the roll. Frequently release oils composed of, for example, poly(dimethylsiloxanes), are also applied to the roll surface to prevent adherence of toner to the roll. Such release oils may interact with the roll surface upon repeated use and in time cause swelling, softening and degradation of the roll. Silicone rubber covering layers which are insufficiently resistant to release oils and cleaning solvents are also susceptible to delamination of the roll cover after repeated heating and cooling cycles.

Toner fusing belts are composed of a continuous flexible material having a smooth surface and superior resistance to heat. The belt substrate can be metallic or polymeric. The surface of the belt is composed of a thinly coated, low surface-energy polymer such as a fluorocarbon or a silicone-polymer.

Fusing members with a surface coating of a fluoropolymer commonly a fluoroelastomer, especially vinylidene fluoride based fluoroelastomers, possess excellent heat, oil and chemical resistance as well as good fatigue and wear characteristics. However, fluoroelastomers with these excellent chemical and mechanical properties have a propensity to interact with toners, especially those formulated from polyesters, causing premature offset.

U.S. Pat. No. 4,264,181 discloses fusing members coated with a metal-filled elastomer surface obtained by nucleophilic-addition curing of a mixture of a metal filler and a vinylidene fluoride-hexafluoropropylene copolymer. Mixtures of the fluoroelastomers with silicone rubbers were mentioned (column 8, lines 26–29) but no specific examples of suitable silicones are taught. The surface coatings disclosed are used in conjunction with functionally substituted polymeric release agents capable of interacting with the metal component.

U.S. Pat. No. 4,853,737 discloses a roll useful in electrostatography having an outer layer comprising cured fluoroelastomers containing pendant polydiorgano-siloxane segments that are covalently bound to the backbone of the fluoroelastomer. This material shows poor wear properties and the silicon content described in this patent must be kept very low in practice to avoid incompatibility.

U.S. Pat. No. 5,141,788; U.S. Pat. No. 5,166,031; and U.S. Pat. No. 5,695,878 disclose a fuser member comprising a supporting substrate having an outer layer of a volume grafted elastomer which is a substantially uniform integral interpenetrating network of a hybrid composition of a fluoroelastomer and a polyorganosiloxane, where said volume graft has been formed by dehydrofluorination of said fluoroelastomer by a nucleophilic dehydrofluorinating agent, followed by addition polymerization by the addition of an alkene or alkyne functionally terminated polyorganosiloxane and a polymerization initiator. The disadvantage of this is that it usually involves at least two extra reaction step to produce higher silicone contents without phase separation. Also the resulting hybrid network structure consists substantially of silicone crosslinks which demonstrate poor wear resistance. In addition, a higher silicone concentration forms on the surface through stratification and as such has poorer wear resistance.

U.S. Patent No. 5,534,347 discloses toner fusing rolls having an oil barrier layer composed of a substrate coated with a fluorocarbon-silicone polymeric composition which is obtained by concurrently curing a fluorocarbon copolymer, a nucleophilic fluorocarbon-curing agent and a heat curable poly($C_{(1-6)}$alkyl)arylsiloxane polymer. This patent does not describe a release layer as the surface energy of the resulting material was too high.

Similarly, U.S. Pat. No. 5,582,917 discloses toner fusing members having a surface layer comprising a substrate coated with a fluorocarbon-silicone polymeric composition obtained by concurrently curing a fluorocarbon copolymer, a nucleophilic fluorocarbon curing agent and a heat curable polyfunctional polymethylsiloxane polymer.

U.S. pat. application Ser. Nos. 09/156,996, 09/156,831, and 09/157,391 describe materials similar in structure to U.S. Pat. No. 5,582,917 and U.S. Pat. No. 5,534,347 being formed from a different process of solution dispersion rather that mechanical incorporation as well as specific uses for those materials. One disadvantage of these is the restriction on the amount of the silicone phase which can be incorporated without large scale phase incompatibility. These materials as well as those of U.S. Pat. No. 5,582,917 and U.S. Pat. No. 5,534,347 are actually misnamed interpenetrating networks as the concentration of silicone based polymer necessary to form a co-continuous phase is outside of the range of phase compatibility.

U.S. Pat. Application Ser. No. 09/156.996. now U.S. Pat. No. 6,075,966, describes a composition whereby true interpenetrating networks are created by the incorporation of a low molecular weight material functionalized polydimethylsiloxane capable of reacting into the fluoroelastomer phase to compatibilize the secondary network of crosslinked polydimethylsiloxane at higher concentration. However at higher concentrations of polydimethylsiloxane in the fluoroelastomer, the properties of the material can be detrimentally affected.

The disadvantage of all the patents described above is in the lack of ability to either form materials with high incorporation levels of polydimethyl siloxane or incorporate silicone without substantially modifying the fluoroelastomer matrix. The formation of a continuous polydimethylsiloxane phase is detrimental to the mechanical properties, and large polydimethylsiloxane phase sizes cause poor coating properties and non-uniform wear and release properties. Modification of the fluoroelastomer invariably leads to a degradation in the mechanical properties which make fluoroelastomers attractive (for example wear, tensile strength, temperature resistance). This is due to the large phase size of the polysiloxane in conjunction with the tendency of these materials to phase invert as polysiloxane content increases.

Thus, there is still a need for materials based on fluorocarbon copolymers which resist abrasion, interact minimally with toners and resist offset, retain the advantageous mechanical and chemical properties characteristic of fluoroelastomers, and exhibit desirable properties of silicone elastomers namely wetting and some swelling characteristics with polydimethylsiloxane for good release and offset properties The object of the inventions described above and the source of their disadvantage is that they focus on overcoming the natural tendency for incompatibility and phase separation between fluoroelastomers and polysiloxanes. A method of the invention described herein circumvents this problem by using preformed particles of polysiloxane. This can be accomplished by providing materials in which the phase size of the polysiloxane layer is independent of the polysiloxane content.

Crosslinked silicone rubber particles possess a number of desirable chemical and physical properties including, for example, good thermal stability, elasticity, water resistance, and lubrication assistance. Because of these properties, silicone rubber particles have been proposed for a variety of applications, such as for example, impact strength improves, low temperature flexibilizers, and processing aids for molding materials, laminates and rubber-modified plastics.

Various methods are known in the art for producing silicone rubber powder. One such method involves pulverizing pre-cured silicone rubber into a powder after it has been frozen with dry ice. This has been disclosed, see Japanese Kokai JP 60-81, 227 Powdered Granular Silicone; Soviet Union Patent No. 952895; and Silicone Rubber in Powder Form, Swanson, Leicht and Wegener, American Chemical Society, Rubber Division, October 1974. It is also possible to pulverize cured silicone rubber into a powder using a grinder at ambient temperature. These methods suffer from the difficulty of obtaining uniform micron sized particles with high productivity as well as being too costly for many applications.

There have also been direct methods developed for producing silicone rubber particles.

European Patent Application Publication No. 025510, Method for Producing Silicone Rubber Powder involves blending a curable liquid silicone rubber composition at a temperatures from −60° C. to plus 5° C., maintaining the mixture at this temperature, and then spraying the mixture into hot air, at a temperature of from 80° C. to 200° C. Their method uses a curable liquid silicone rubber composition composing a liquid, reactive-group-containing organopolysiloxane with at least two alkenyl groups per polymer, an organopolysiloxane crosslinker containing at least two hydride functionalities per polymer chain, and a catalyst. The technique can prepare spherical silicone rubber particles with diameters from several hundred microns to several hundred millimicrons.

U.S. Pat. No. 4,743,670 Method for Producing Silicone Rubber Powder is also directed to a method for producing silicone rubber powder. This method involves preparing a heat-curable, liquid silicone rubber dispersion in water at a temperature of from 0° C. to 25° C. in the absence of a surfactant.

U.S. Pat. No. 4,742,142 Method of Producing Silicone Rubber Powder describes a method for making small silicone rubber powders of uniform shape without grinding or cryofracturing. Their method uses a curable liquid silicone rubber composition containing a liquid, reactive-group-containing organopolysiloxane with at least two alkenyl groups per polymer, an organopolysiloxane crosslinker containing at least two hydride functionalities per polymer chain, and a catalyst. The ingredients are blended together at a temperature of from −60° C. to plus 5° C., preferably from −30° C. to 0° C., to prevent the mixture from curing prematurely. The mixture is then emulsified by blending with water and a surfactant at a temperature from 0° C. to 25° C. The emulsion is then dispersed into water and cured at a temperature of at least 25° C. Illustrative examples demonstrate the curing step, using water at 40° C. and 80° C., followed by isolating the particles to produce spherical crosslinked rubber particles of about 10 and 20 microns. Japanese Patent Application JP 62-257939 discloses making silicone rubber particles having particle sizes below 20 microns. These particles are made by a process similar to that disclosed in U.S. Pat. No. 4,742,142 using spray drying to isolate the cured silicone rubber particles.

U.S. Pat. No 4,962,165 describes an ambient temperature process for producing micron sized particles by a somewhat tedious process beginning with small molecular weight materials down to oligomers.

The present invention incorporates preformed silicone-containing polymer particles into a fluoroelastomer network. The present invention incorporates high levels of polydimethylsiloxane without the formation of a continuous phase while minimizing the impact of the polydimethylsiloxane on the mechanical properties of the fluoroelastomer. The present invention prepares a fluoroelastomer coating containing silicone particles suitable for use on a fuser member.

SUMMARY OF THE INVENTION

The composite material of the current invention comprises a fluorocarbon elastomer, a preformed polysiloxane particle, and a means for curing the fluorine containing elastomer. The fuser member of the current invention comprises a substrate or base, and an outermost layer comprising a) a fluorocarbon elastomer
b) a preformed silicone rubber particle
c) a means for curing (a)

and an optional intermediate layer between the base and the outermost layer comprising one or more layers. Herein, the terms "silicone rubber" and "silicone elastomer" are used to describe a crosslinked polydi($C_{1-8}$ alkyl)siloxane elastomer. The coating of the present invention provides a fluorine containing elastomer composite containing polysiloxane particles. Because the silicone rubber particles are preformed the composite is easily formed with a controlled phase size. In addition, the composite of the present invention can incorporate high levels of polysiloxane without forming a continuous polysiloxane phase and without substantially altering the fluorine containing elastomer. A fuser member of the present invention can maintain a surface exhibiting substantial polysiloxane character, thereby having good release properties and good wetting of the release agents, yet it can resist the swelling of release agents since the siloxane particles do not form a continuous phase in the layer.

DETAILED DESCRIPTION OF THE INVENTION

The composite material of the current invention comprises:

(a) a fluorocarbon elastomer,
(b) preformed polysiloxane particles,
(c) a means for curing (a) including but not limited to curing agents and accelerators, and
(d) optional fillers to tailor other properties; including but not limited to thermal property modifiers and mechanical property modifiers as known to one skilled in the art.

Suitable fluorine containing elastomers include fluorocarbon copolymers. As used herein, the term "copolymer" refers to the product of polymerization of two or more substances at the same time, for example terpolymers which contain three distinct monomers.

Suitable fluorocarbon copolymers of the invention include the vinylidene fluoride based fluoroelastomers containing hexafluoropropylene known commercially as Viton® A. Also suitable are the copolymers of vinylidene fluoride, hexafluoropropylene and tetrafluoroethylene known commercially as Viton® B, Fluorel 5840Q, Fluorel 2630 and Fluorel™ FX-9038. Viton® A, Viton® GF and Viton® B and other Viton® designations are trademarks of E.I. Dupont de Nemours and Company, commercially available materials include, for example, vinylidene fluoride-hexafluoropropylene copolymers Fluorel™ FX-2530, Fluorel™ FC 2174 and Fluorel™ FC 2176. Fluorel™ is a trademark of 3M Company. Fluoroelastomers containing perfluoro(methylvinylether) and a cure site monomer such as Viton® GLT are also suitable. Other vinylidene fluoride based polymers which can be used are disclosed in U.S. Pat. No. 4,272,179 the disclosure of which is hereby incorporated by reference. Fluorocarbon elastomers not based on vinylidene fluoride may also be used. These may contain cure site units incorporated at a low frequency. Some examples suitable for use include Alfas, a copolymer of TFE and ethylene, and higher TFE content elastomers containing groups that disrupt the TFE crystallinity, for example perfluoro(alkylvinylethers), 1-hydropentafluoropropene, chlorotrifluoroethylene and the like. Mixtures of the foregoing fluoroelastomers may also be suitable.

Although it is not critical in the practice of this invention, the number-average molecular weight range of the fluorocarbon copolymers may vary from a low of about 10,000 to a high of about 200,000. In the more preferred embodiments, the vinylidene fluoride-based fluoroelastomers have a number-average molecular weight range of about 50,000 to about 100,000.

Suitable fluorocarbon-curing agents or crosslinking agents for use in the process of the invention include the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Other conventional cure or crosslinking systems may be used to cure the fluoroelastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate.

Suitable accelerators for the bisphenol curing method include organophosphonium salts, e.g., halides such as benzyl triphenylphosphonium chloride, as disclosed in U.S. Pat. No. 4,272,179 cited above.

Fluoroelastomer latexes may be particularly suitable as it will become apparent later. Latexes generally use nucleophilic addition cure system based on hindered amines as the water in the latex affects the bisphenol curing methods.

Suitable fillers for producing these composites include mineral oxides, such as alumina, silicate or titanate, carbides, and carbon of various grades. Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, lead oxide, copper oxide and the like, which can be used as mixtures with the aforementioned fillers in various proportions.

The base composition is obtained by compounding the fluorocarbon elastomer, metal oxide or hydroxides to act as acid acceptors, fluorocarbon-curing agent with a fluorocarbon-curing accelerator and optionally other fillers to form a uniform material. Compounding (mechanical mixing) may be carried out in a two-roll mill by compounding the fluorocarbon copolymer, the accelerator and fillers (if present) until a uniform, dry, smooth sheet is obtained. This compounding process can be carried out at a temperature of, for example, from 50° to 70° F. (approx. 10° to 21° C.), preferably from 55° to 65° F. (approx. 13° to 28° C.). Variations to the order of addition of the components can be made by those skilled in the art without causing disintegration of the composition.

The fillers are optional; the curing agent and accelerator may be omitted at this stage and added just before the composition is applied as a coating to a surface. The accelerator promotes crosslinking between the curing agent and the fluorocarbon copolymer. The resulting mixture may be solution milled to form a homogeneous mixture. To this coating formulation, the previously described preformed silicone rubber particles are added.

Various methods are known in the art for producing silicone rubber particles, which can be used in this invention. While the method of preparation of the particles is peripheral to this invention, the method of production will impact the size, shape, and distribution affecting the usefulness of the particles in various applications. For most coating applications the particle size is preferably 50 microns or less. For example, direct grinding may produce a particle too irregular for applications requiring surface smoothness, while cryogrinding may overcome this limitation. In certain applications where the surface smoothness is of particular importance, for example, fusing members, a more preferred particle size is less than 15 microns. Particle sizes as low as 0.1 micron may be useful; however preparation is generally limited to about 0.5 micron using emulsion polymerization. Use of particles prepared by emulsion polymerization will generally require complete removal of the water, as this could impact the cure. Using a fluoroelastomer latex avoids requiring complete separation of the particles from the emulsion.

The silicone rubber particles are comprised of the crosslinked product of a polyfunctional polydi($C_{1-8}$ alkyl) siloxane polymer, containing functional reactive groups for condensation, peroxide or preferably addition cure. The reactive functional groups may be pendent on the side of the chain or at the terminal ends. At least two reactive functional groups are required for complete crosslinking, with more required for a tighter network. The reactive functional groups may comprise monofunctional, difunctional, trifunctional, and tetrafunctional siloxane groups; with one or more functional group per chain. A tri or tetra functional vinyl hydrocarbon crosslinker such as triallyl cyanurate may also be used. The polymer chains should not be so short and highly crosslinked as to lose any elastic resiliency nor so long as to have no mechanical integrity. The resulting particles may contain some unreacted silicone or nonfunctional silicone residue. The incorporation of other siloxanes is not specifically restricted and include any minor amounts of di-phenyl, phenyl-methyl, and trifluoro units. For application as a fuser member these should not be in such high concentration as to prevent interaction and swell with silicone release fluids. The particles may also be prepared from compositions that further include at least one structural filler, for example fume silica. Fillers may also be incorporated to increase the thermal conductivity of the particles. Said fillers typically have a thermal conductivity above about 5 BTU/ft. hr. ° F.

A preferred method for preparing silicone rubber particles is based on an emulsion comprising liquid, reactive group-containing multifunctional vinyl terminated polysiloxane with a multifunctional hydride terminated polysiloxane and a curing catalyst. The silicone rubber compositions cure into a rubbery elastomer by heating. With regard to the curing mechanism of the compositions, the present method can utilize addition-reaction types. Several commercially available silicone rubber particles exist such as the X-52 series silicone rubber particles from Shin-Etsu Chemical Corporation in Tokyo Japan.

A latex emulsion can be prepared by a number of methods. In accordance with one of these methods, the mixture containing surfactant, catalyst and uncured liquid silicone resin compositions are passed through a commercial homogenizer to provide adequate mixing the distilled water is added and again passed through a commercial homogenizer to form the emulsion.

The surfactants useful for forming the emulsion are not specifically restricted and include any of the nonionic and anionic surfactants and emulsifying agents that have heretofore been employed for this purpose.

The emulsified liquid silicone rubber composition is cured. At this point the suspended particles may be added directly to a fluoroelastomer latex or separated and dried for use with a conventional fluoroelastomer. The resulting particles are ready to be dispersed in a curable fluoroelastomer material.

To prepare the silicone particle containing fluoroelastomer composite the particles must be combined with the fluoroelastomer. The particles may be compounded directly into the fluoroelastomer composite or more preferably dispersed in a solution of the fluoroelastomer. The fluoroelastomer composition can be reduced to small particles for dispersing in a coating solvent. Coating solvents which can be used include polar solvents, for example, ketones, acetates and the like. Preferred solvents for the fluoroelastomer based composites are the ketones, especially methyl ethyl ketone and methyl isobutyl ketone. In another aspect of the invention, for example when a solvent transfer coating process is contemplated, the fluorocarbon-curing agent can be withheld from the compounding mixture and added to the coating medium, thus minimizing any tendency for premature curing of the composition.

Preferred compositions of the invention have composition with the following general features:

Accelerator 0–10 parts based on accelerator choice,
Crosslinking Agent 0.1–12 parts based on crosslinking agent choice,
Acid Acceptor 0–30 parts based on the choice of acid acceptor, and
Silicone Rubber Particles 3–300 parts.
Where the amounts are based on 100 parts of fluoroelastomer.

The amount of optional fillers is based on the mechanical and thermal properties described as has been well defined in the art and does not impact the current invention. Thus the amount can range from 0 to 45 volume percent of the system. Minor additions and modifications can be anticipated to those skilled in the art.

Addition of silicone particles in quantities less than 3 parts based on 100 parts fluoroelastomer does not provide significant benefit. Also incorporation of silicone rubber particles at concentrations greater than 300 parts per 100 parts fluoroelastomer would tend to cross the percolation threshold yielding a material where the silicone rubber properties would dominant which is undesirable.

The composites of the invention are dispersed in the coating solvent at a concentration of between about 10 to 50 weight percent, preferably between about 20 to 30 weight percent and coated on the fusing member to give a 10 to 100 $\mu$m thick sheet on drying.

Curing of the composite is carried out according to the well-known conditions for curing vinylidene fluoride based copolymers ranging, for example, from about 12–48 hours at temperatures of between 50° C. to 250° C. Preferably the coated composition is dried until solvent free at room temperature, then gradually heated to about 230° C. 12 to 24 hours, then maintained at that temperature for 24 hours.

In accordance with the present invention, the coated article can be a fusing member in the form of a roll, belt or any surface having a suitable configuration for fixing or fusing a thermoplastic toner image to a receiver such as a paper sheet. The underlying structure onto which the coating is applied is called the substrate. When used with fusing rolls, substrate onto which the composite of the invention can be coated directly on is the fusing roll core. The coating can also be applied on an underlying intermediate layer which is bonded directly or indirectly to the core. This intermediate layer is preferably either a silicone elastomer, for example, EC 4952 silicone (sold by Emerson Cummings Co.) or a fluorocarbon elastomer. When the fusing member is in the form of a belt, the belt comprises a continuous flexible substrate made of metal or polymeric material onto which the composite of the invention can be coated. The fusing members can be coated by conventional techniques; however, solvent transfer coating or spray techniques are preferred.

The rolls and belts produced in accordance with the present invention are thus useful in electro-photographic copying machines to fuse heat-softenable toner to an image carrying receiver sheet. This can be accomplished by contacting a receiver, such as a sheet of paper, to which toner particles arc electrostatically attracted in an imagewise fashion with such a fusing member. Such contact is maintained at a temperature and pressure sufficient to fuse the toner to the receiver. The present invention is further useful as a member to apply release agents, for example a donor roller member in a donor roll oiler. Said release agents include but are not limited to polydimethylsiloxane, amino functionalized polydimethylsiloxane, mercapto functionalized polydimethylsiloxane, hydride functional polydimethylsiloxane, and those further described in U.S. Pat. No. 4,853,737 and U.S. Pat. No. 5,595,823 incorporated herein by reference.

EXAMPLE 1

Preparation of Silicone Rubber Particles

This example describes the preparation of the polydimethylsiloxane particles used in used in examples 2–3.

A mixture of SHC PS 124 (3–4%) methylhydro (96–97%) dimethylsiloxane polymer (20 g) and SVC PS 443 Polydimethylsiloxane, vinyldimethyl terminated polymer (30 g) was mixed using a Kady Mills homogenizer for 1 minute. Tween 80 (4.6 g) was added and the mixture was homogenized for 20 seconds. Platinum-divinyltetramethyldisiloxane complex (0.5 g in 15 g Methanol) was added and mixed for 10 seconds. This mixture was added to 350 g of distilled water and a stable latex was prepared by homogenization for 10 to 15 minutes.

The latex was heated to 60° C. for 15 hours. The latex was then deemulsified with anhydrous sodium sulfate (20 g) and the silicone rubber particles were obtained by filtration under a vacuum, washing with distilled water, and drying under vacuum at 25° C. The resulting particle size distribution was 2–12 um and the particles did not agglomerate.

EXAMPLE 2

Viton® GF fluoroelastomer (500 g), Zinc Oxide obtained from Aldrich Chemical Company (Cat No. 20553-2) (50 g), and Carbon Black (5 g) were thoroughly compounded on a two-roll mill at 63° F. (approx. 17° C.) with water cooling until a uniform, dry composite sheet was obtained. The uniform, dry, flexible composite sheet obtained was divided into small pieces. Silicone rubber particles prepared as in Example 1 (2.0 g), 8.0 g of the composite sheet, Viton Curative No. 50 (0.18 g), and Aminofunctional polydimethylsiloxane (PS513 obtained from United Chemicals) (0.8 g) were suspended in a methyl ethyl ketone solution to form a 20 weight percent coating dispersion. Dispersion was formed by roll milling for approximately 24 hours. A sample of the dispersion was coated on Kapton film and imaged with a microscope. The silicone particles were uniformly dispersed throughout the coating. A roller coating was made according to the following procedure. An aluminum core was cleaned and then primed with a thin layer of silicone primer and dried in ambient air before application of the base cushion. The base cushion, a commercially available Exsell roller was wiped clean with methylethylketone. The above-described dispersion was degassed for 2 minutes under 25 mmHg before it was ring coated onto the base cushion layer. The fuser roller was cured by air drying for 1 hour followed by 24 hours ramp to 230° C. and then 24 hours at 230° C. The material demonstrated good coating quality on the roller.

EXAMPLE 3

The dispersion was made following essentially the same procedure as described in Example 2 with the following ingredients. Silicone rubber particles (6.5 g), 3.5 g of the composite sheet material, Viton Curative No. 50 (0.07 g), and Aminofunctional polydimethylsiloxane (PS513 obtained from United Chemicals) (0.35 g). A Kapton coating and fuser roller coating were made as described in Example 2 using this dispersion. Similar to Example 2 the silicone particles were uniformly dispersed throughout the coating and the material demonstrated good coating quality on the roller. Optical microscopy revealed the silicone particles to be uniformly dispersed throughout the film.

COMPARATIVE EXAMPLE 1

A dispersion was made following essentially the same procedure as described in Example 3 except that the silicone rubber particles were replaced by SFR-100, which was added as in Example 3 and is similar to examples described in U.S. Pat. No. 6.075.966.

The SFR-100 silicone (6.5 g) used was obtained from General Electric Co. The above described dispersion was coated on Kapton as described in Example 2, however microscopy revealed that the fluoroelastomer was dispersed as discrete domains in a continuous silicone matrix indicating that phase inversion had occurred.

Thus according to the present invention a materials has been provided which is based on fluoroelastomers and polysiloxane, yet accommodates the problems of using a polysiloxane resins namely lack of phase size control and the tendency of phase inversion at high polysiloxane content. This is achieved through the incorporation of pre-formed particles of silicone rubber. Whereby, the phase size of the polysiloxane particles are independent of the polysiloxane content and phase inversion is not possible. The invention has been described in detail with particular reference to certain preferred embodiments thereof, but it should be appreciated that variations and modifications can be effected within the scope of the invention.

What is claimed is:

1. A process for forming a fluroelastomer composite material for use in preparing an image member containing a substrate, said process comprising:

combining a curable fluoroelastomer with 3–300 parts of preformed polysiloxane particles per 100 parts of said curable fluoroelastomer in an organic solvent, thereby forming a composite mixture in said organic solvent, said composite mixture consisting essentially of said fluoroelastomer and said polysiloxane particles; and milling said composite mixture in said organic solvent, thereby forming a uniform coating dispersion of said composite mixture.

2. The process of claim 1 further comprising:

compounding curing means with said curable fluoroelastomer prior to said combining.

3. The process of claim 2 further comprising:

compounding a filler with said curable fluoroelastomer and said curing means prior to said combining.

4. The process of claim 1 further comprising:

adding curing means to said uniform coating dispersion.

5. The process of claim 1 further comprising:

coating said substrate with said uniform coating dispersion, then removing said organic solvent, thereby forming a layer of fluoroelastomer composite mixture on said substrate.

6. The process of claim 5 further comprising:

curing said layer of fluoroelastomer composite mixture on said substrate, thereby forming an imaging member.

7. The process of claim 6 wherein said curing is carried out at a temperature of 50–250° C. for 12–48 hours.

8. The process of claim 1 wherein said organic solvent comprises a ketone.

9. The process of claim 2 wherein said curing means comprises a curing agent and an accelerator.

10. The process of claim 9 wherein said curing agent is a nucleophilic addition curing agent.

11. The process of claim 9 wherein said curing means further comprises an acid acceptor.

12. The process of claim 5 further comprising:

prior to coating said substrate with said uniform coating dispersion, forming an intermediate layer on said substrate.

13. The process of claim 1 wherein said polysiloxane particles are formed from the crosslinked product of polysiloxanes selected from the group consisting of:

a) at least one vinyl addition curable poly-functional polydi($C_{1-8}$ alkyl)siloxane, said polysiloxane comprising at least two reactive functional units selected from the group consisting of monofunctional, difunctional, trifunctional and tetrafunctional siloxane units;

b) at least one condensation curable polyfunctional polydi($C_{1-8}$ alkyl)siloxane, said polysiloxane comprising at least two reactive functional units selected from the group consisting of monofunctional, difunctional, trifunctional and tetrafunctional siloxane units;

c) at least one peroxide curable polyfunctional polydi($C_{1-8}$ alkyl)siloxane, said polysiloxane comprising at least two reactive functional units selected from the group consisting of monofunctional, difunctional, trifunctional and tetrafunctional siloxane units; and combination of a), b), and c).

14. The process of claim 13 wherein said polysiloxane comprises polydimethylsiloxane.

15. The process of claim 1 wherein said curable fluoroelastomer comprises monomers selected from the group consisting of ethylene, vinylidene fluoride, tetrafluoroethylene, hexafluoropropylene, perfluoro (alkylvinylethers), and mixtures thereof.

16. The process of claim 1 wherein said preformed polysiloxane particles and said curable fluoroelastomer are present in a weight ratio of 0.1:1 to 3:1.

17. The process of claim 1 wherein said polysiloxane particles have a average diameter of less than 50 microns.

18. The process of claim 1 wherein said fluoroelastomer composite mixture comprises:

3–300 parts of preformed polysiloxane particles;

0.2 to 12 parts of a crosslinking agent;

0–10 parts of an optional curing accelerator; and

0–25 parts of an optional acid acceptor, all based on 100 parts of said curable fluoroelastomer.

19. The process of claim 3 wherein said compounding is carried out using a two-roll mill.

\* \* \* \* \*